(12) United States Patent
Lee

(10) Patent No.: US 8,061,167 B2
(45) Date of Patent: Nov. 22, 2011

(54) CAR HANDLER LOCK

(76) Inventor: Chi-Hou Lee, Kaohsiung County (TW)

( * ) Notice: Subject to any disclaimer, the term of this patent is extended or adjusted under 35 U.S.C. 154(b) by 104 days.

(21) Appl. No.: 12/541,969

(22) Filed: Aug. 16, 2009

(65) Prior Publication Data
US 2011/0036132 A1   Feb. 17, 2011

(51) Int. Cl.
*B60R 25/02* (2006.01)
(52) U.S. Cl. ............................................ 70/209; 70/211
(58) Field of Classification Search ................... 70/209, 70/211, 212, 225, 226, 238
See application file for complete search history.

(56) References Cited

U.S. PATENT DOCUMENTS

| 2,463,195 | A | * | 3/1949 | Mungan | 70/416 |
|---|---|---|---|---|---|
| 3,457,745 | A | * | 7/1969 | Barber | 70/424 |
| 3,738,137 | A | * | 6/1973 | Jones | 70/428 |
| 3,805,564 | A | * | 4/1974 | Velardo | 70/18 |
| 3,967,475 | A | * | 7/1976 | Zane | 70/18 |
| 5,119,651 | A | * | 6/1992 | Yang | 70/52 |
| 5,461,891 | A | * | 10/1995 | Noel | 70/18 |
| 5,566,560 | A | * | 10/1996 | LiCausi | 70/18 |
| 5,784,908 | A | * | 7/1998 | Hileman, Jr. | 70/209 |
| 5,816,082 | A | * | 10/1998 | Gabrielyan | 70/209 |
| 5,826,448 | A | * | 10/1998 | Graham | 70/209 |
| 5,842,360 | A | * | 12/1998 | Somerfield | 70/209 |
| 2003/0106354 | A1 | * | 6/2003 | Vito | 70/209 |
| 2008/0236217 | A1 | * | 10/2008 | Ruffini | 70/209 |
| 2009/0113958 | A1 | * | 5/2009 | Yu | 70/209 |

* cited by examiner

*Primary Examiner* — Llyod Gall

(57) ABSTRACT

A car handler lock mainly includes a vertical frame having a U shape cut, and a lock device is arranged to the opening of the U shape cut. The car handler lock also includes a buckle body. The buckle body includes a sheet shield unit and a bridge buckle arranged between the shield unit and the lock unit of the vertical frame. The bridge buckle will cover the linking gaps between the shield unit and the vertical frame while the bridge buckle is locked to the lock device. The U shape cut of the vertical frame will be slid in and fixed to a shaft of the car handler, and the bridge buckle of the buckle body will be locked to the lock device so that the shield unit will provide an all-round protection to the car handler. The lock assembly is light and convenient by its sheet components.

3 Claims, 16 Drawing Sheets

CAR HANDLER LOCK

FIELD OF THE PRESENT INVENTION

The present invention relates to lock, and particular to a lock capable of obstructing a car handler.

DESCRIPTION OF THE PRIOR ART

For car burglarproof concern, various locks are put on the market. Most of the car locks are stick type such as a Taiwan patent No. 140509 (car handler lock assembly) illustrated in FIG. 1. The schematic view shows the car handler lock assembly 1 includes a lock body 11, an extending stick 12, and a hook stick 14. The hook stick 14 can be slid inside the extending stick 12 through a through hole 15 formed to the lock body 11, and grooves 16 formed to the hook stick 14 can be locked by a lock core 17 of the lock body 11. With reference to FIG. 2, a schematic view showing the operation of the lock assembly, a car handler A is hooked and clamped by a hook 13 and the lock body 11. The extending stick 12 protruding from the handler A will be blocked by the windscreen or the driver while steering so as to provide a burglarproof function.

Another example such as a Taiwan patent No. 484845 (relates to car handler lock) is illustrated in FIGS. 3 and 4. The schematic views show the car handler lock 2 and its operation. By the same principle of previous design, the car handler lock 2 pushes against an inner circle of the handler A by its lock stick 21 and hooks 22 so as to obstruct steering of the handler A.

One another example such as a Taiwan patent No. 233581 (related to car handler lock improvement) is illustrated in FIGS. 5 and 6, the schematic views showing the lock body 3 and its operation. The lock body 3 has an upper lock body 32 pivoted to a lower lock body 31. Cuts 33 and 34 are formed to the upper and lower lock body respectively. The upper lock body 32 links a long plank 35 with a lock core 36. The cuts 33 and 34 can clamp the handler A and be locked by the lock core 36 with the bent plank 35 penetrating the handler A. The long plank 35 will be stuck to a predetermined position of the car. Generally, the previous locks have disadvantages described in the following.

1. Not Light and Convenient

The stick body and hook body for fixing the handler and the extending stick for obstructing objects in a car are big and heavy. It will cause collisions while using and also hard to be operated by female users. The storage especially disturbs the users.

2. Poor in Burglarproof Function

The previous locks are easily removed by a common trick of cutting a part of the handler clamped by the locks.

3. Lack of Commonness

The hooks or the cuts of previous locks can not fit various handlers with different sizes and diameters. It happens that the handler can not be tightly fixed by the locks or the handler is not fit in the hooks or the cuts. The lock is thus loose and sometimes unable to lock.

SUMMARY OF THE PRESENT INVENTION

Accordingly, the primary object of the present invention is to provide a car handler lock against the prior disadvantages. The car handler lock mainly includes a vertical frame. The vertical frame has a U shape cut, and a lock device is arranged to the opening of the U shape cut. The car handler lock also mainly includes a buckle body. The buckle body includes a sheet shield unit and a bridge buckle arranged between the shield unit and the lock unit of the vertical frame. The bridge buckle will cover the linking gaps between the shield unit and the vertical frame while the bridge buckle is locked to the lock device. The U shape cut of the vertical frame will be slid in and fixed to a shaft of the car handler, and the bridge buckle of the buckle body will be locked to the lock device so that the shield unit will provide an all-round protection to the car handler.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
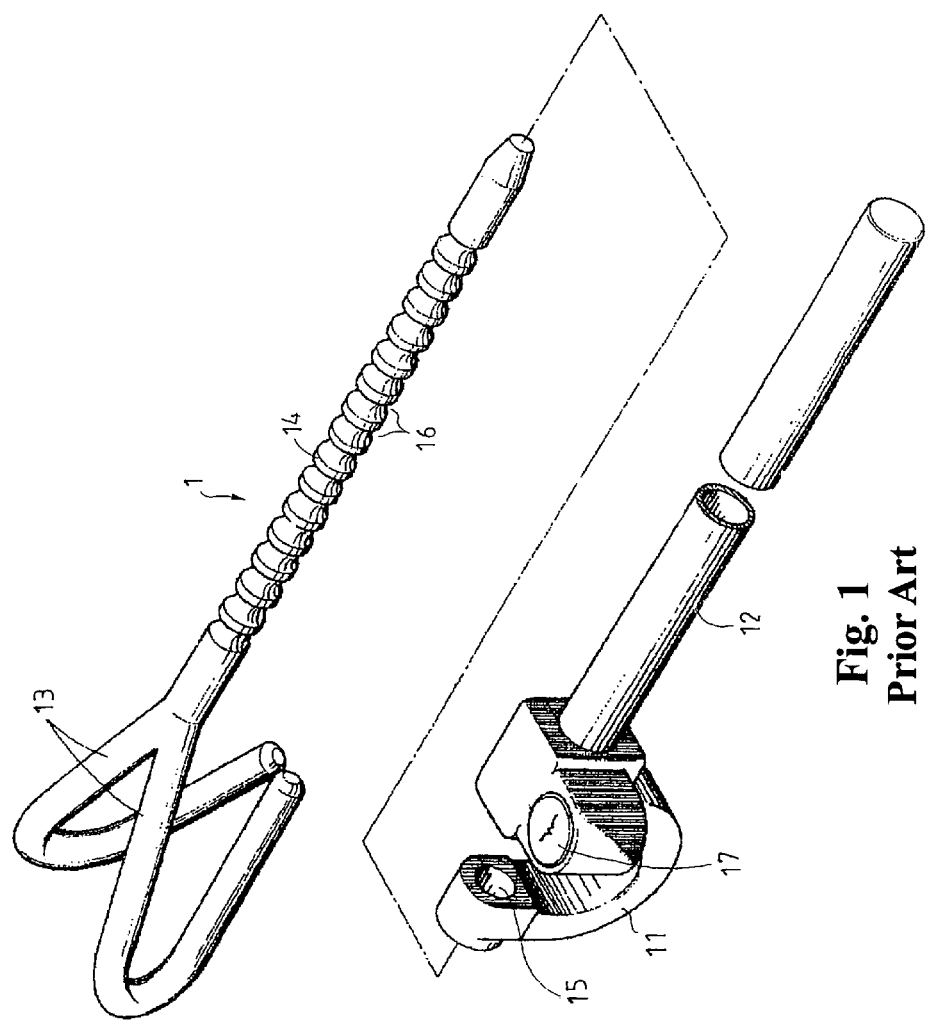
FIG. 1 is a schematic view showing a prior car handler lock.
Figure 2:
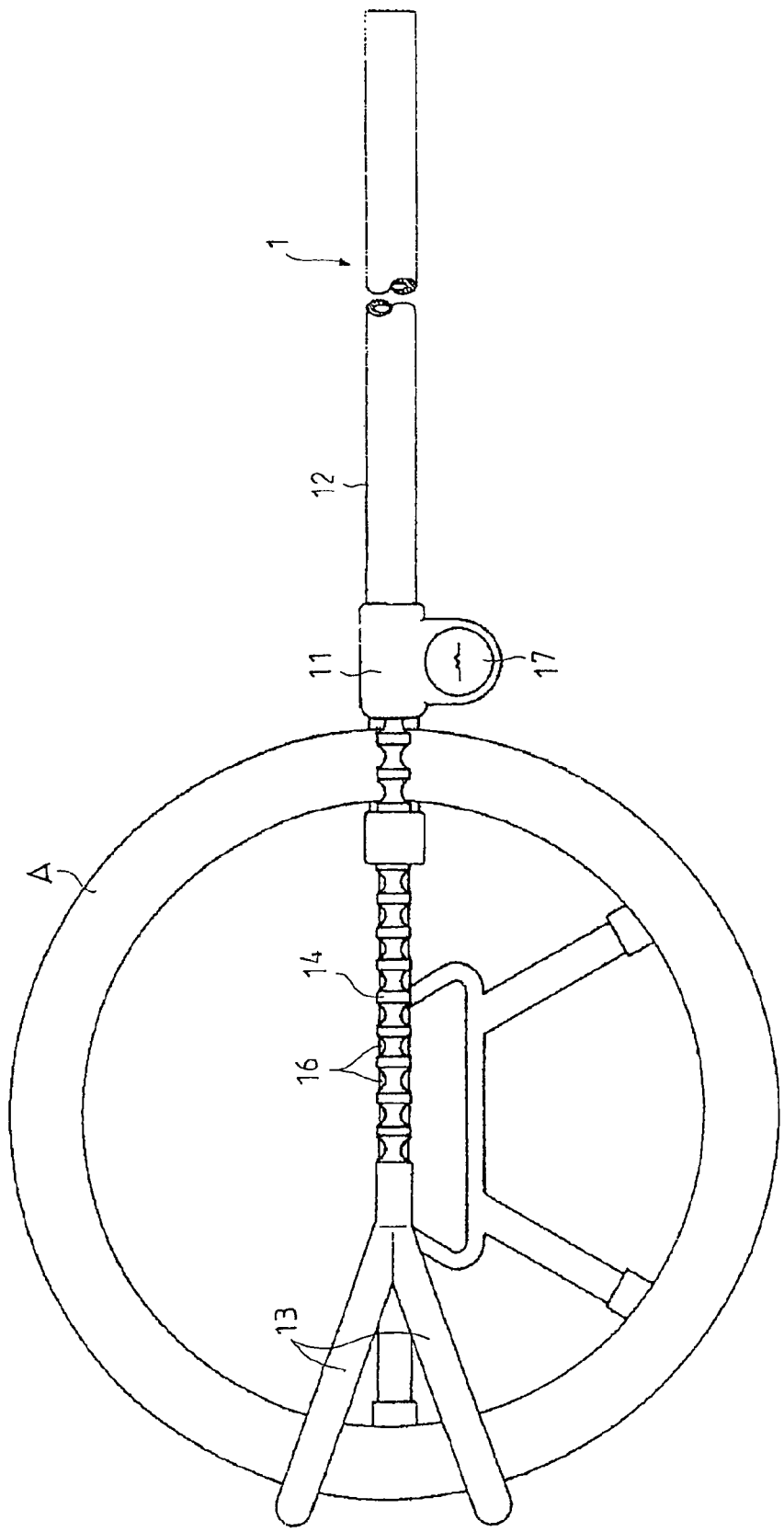
FIG. 2 is a schematic view showing an operation of the prior car handler lock.
Figure 3:
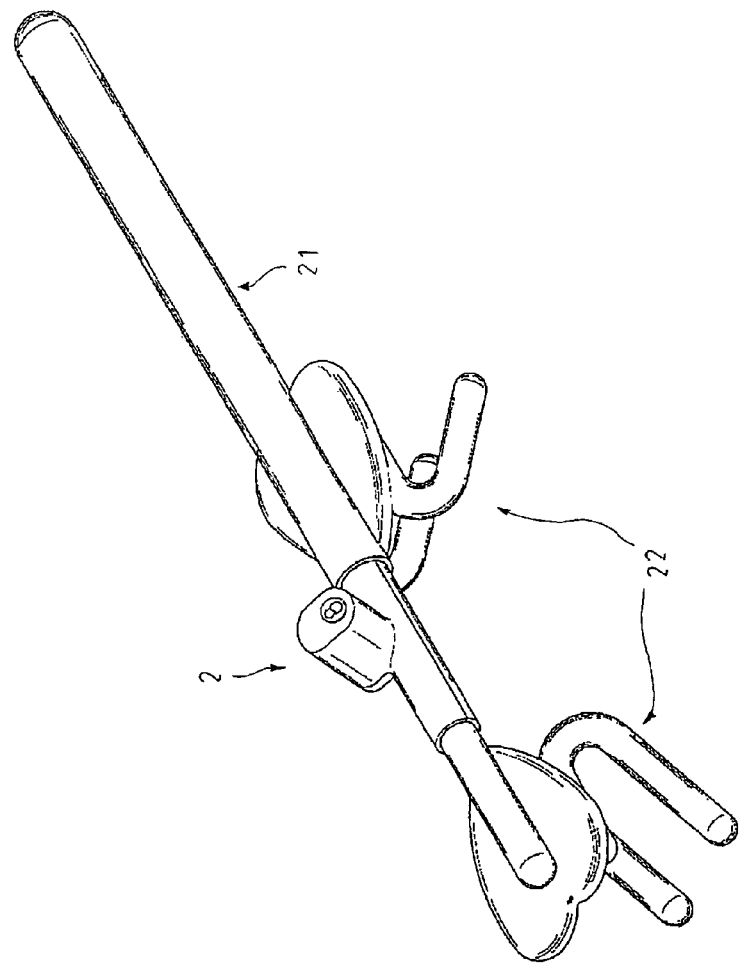
FIG. 3 is a schematic view 2 showing another prior car handler lock.
Figure 4:
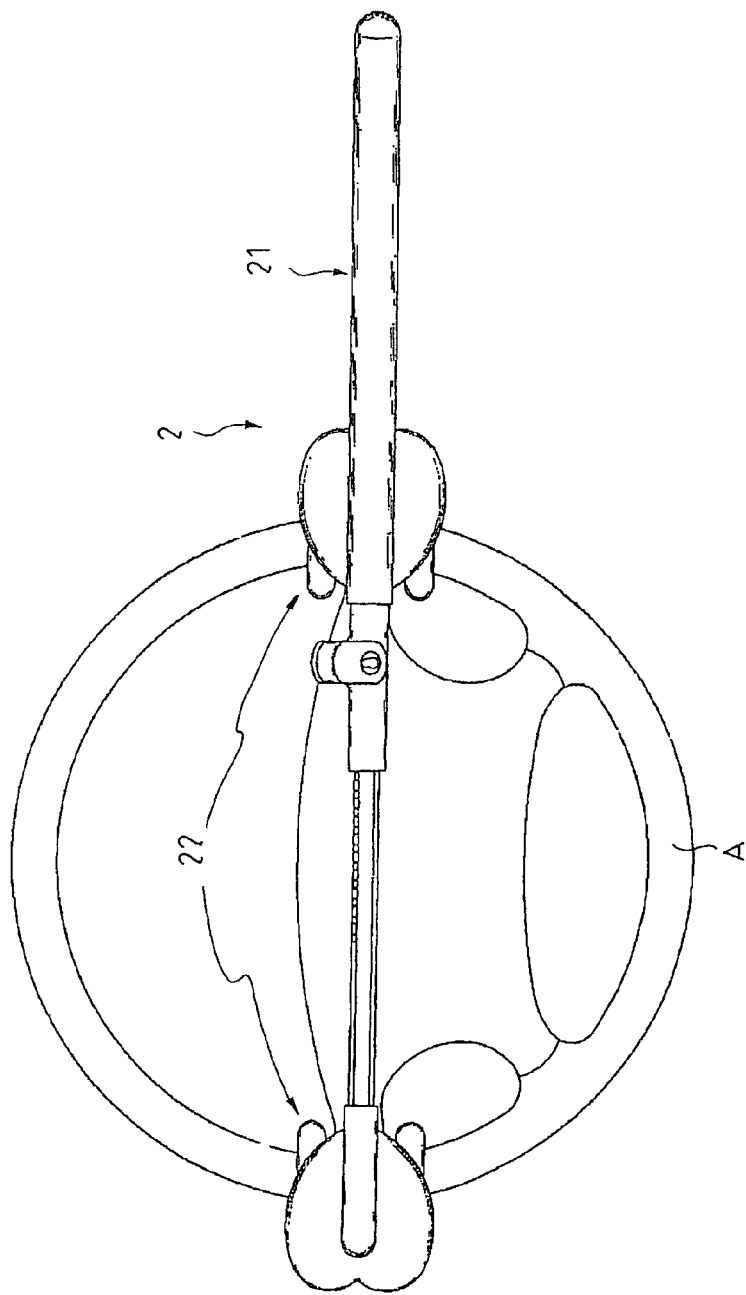
FIG. 4 is a schematic view 2 showing an operation of the prior car handler lock illustrated in FIG. 3.
Figure 5:
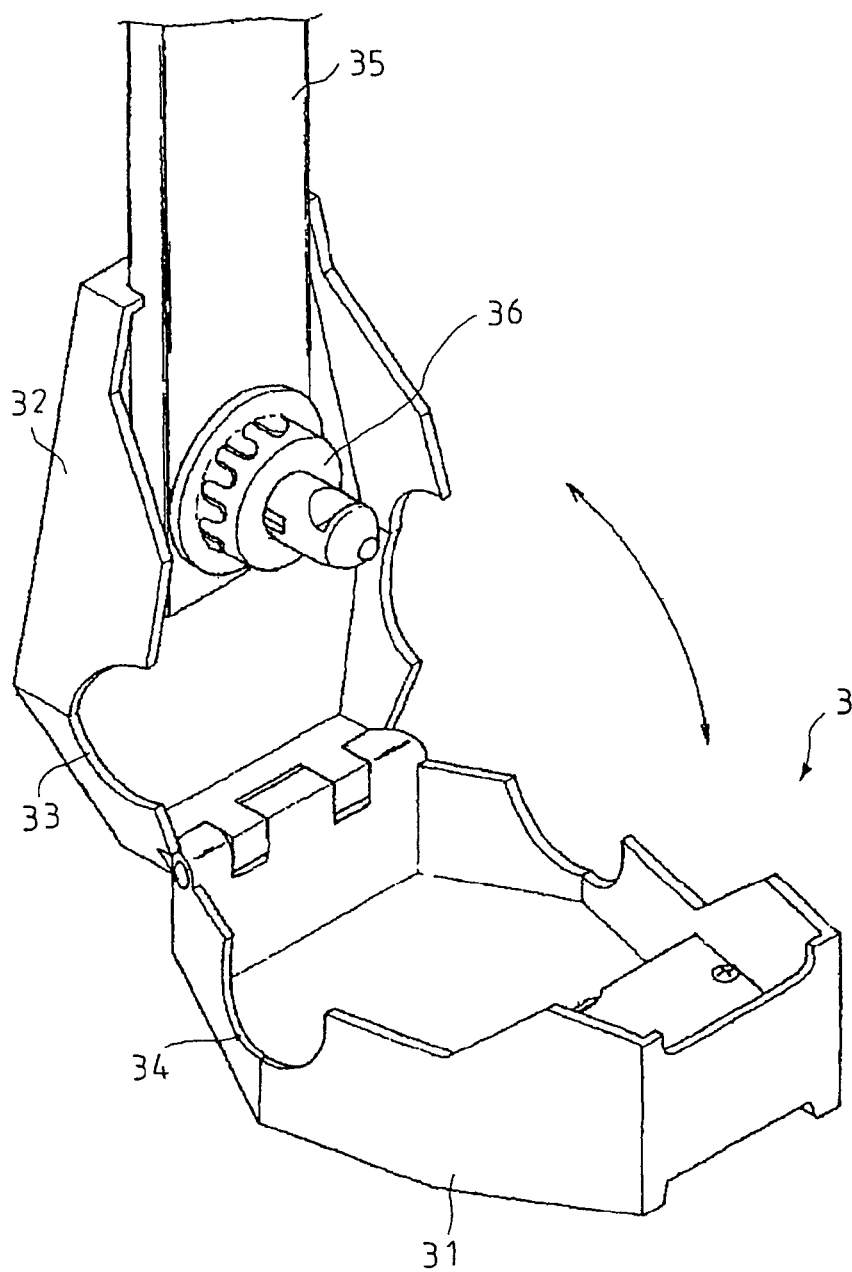
FIG. 5 is a schematic view 3 showing on another prior car handler lock.
Figure 6:
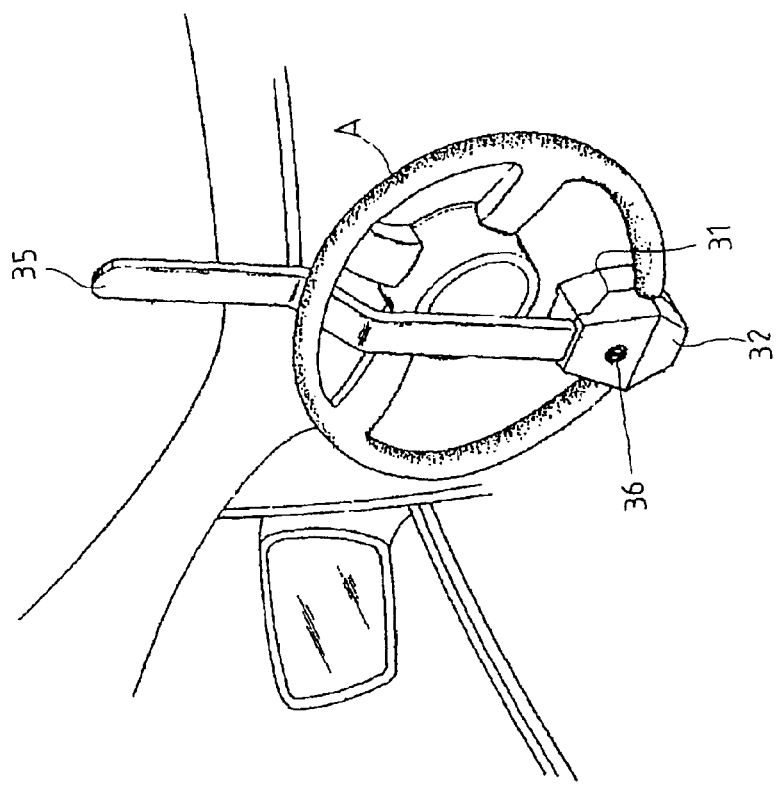
FIG. 6 is a schematic view 3 showing an operation of the prior car handler lock illustrated in FIG. 5.
Figure 7:
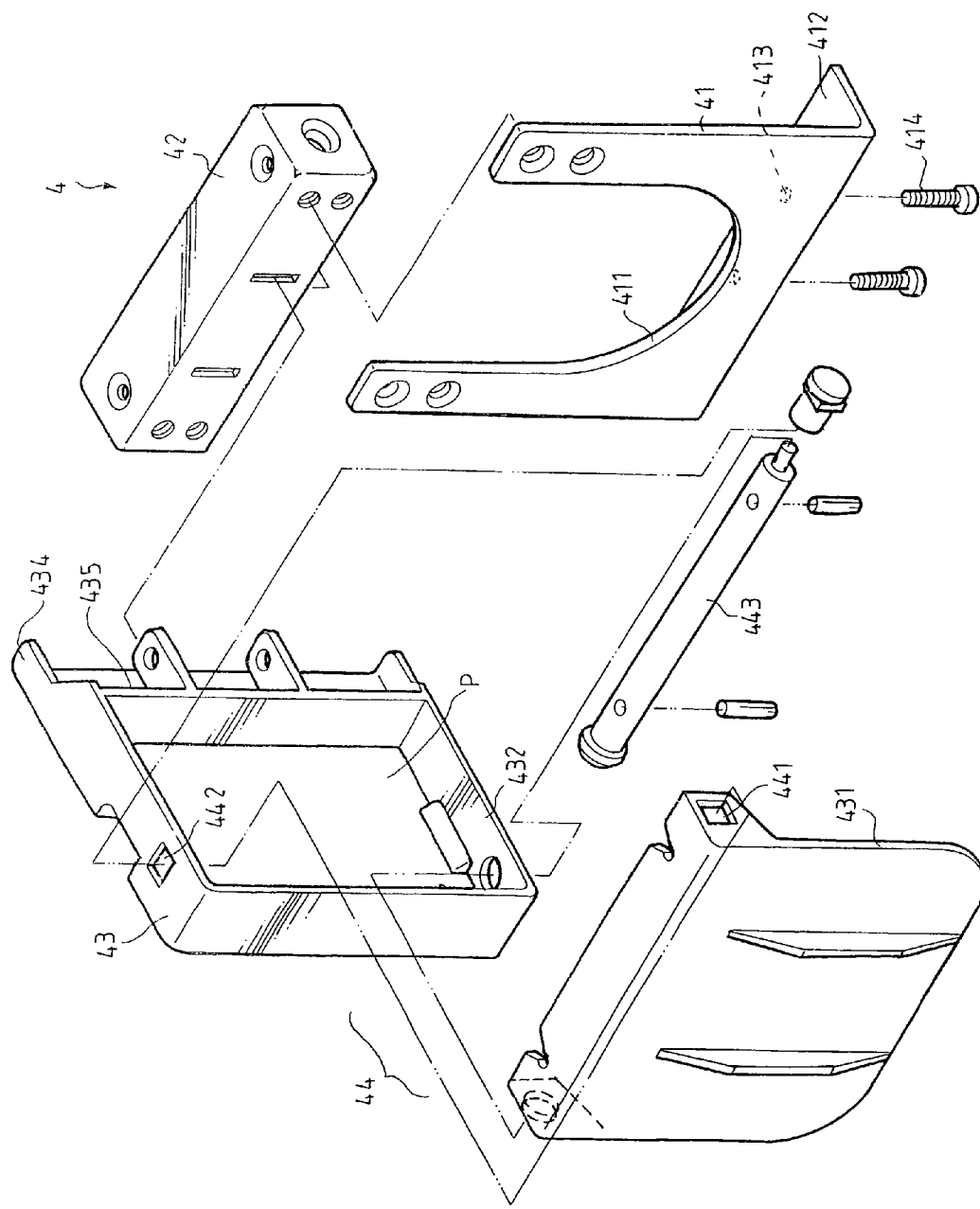
FIG. 7 is a detail exploded drawing of a car handler lock according to the present invention.

Referring to the FIG. 7, a car handler lock 4 includes a vertical frame 41.

The vertical frame 41 is preferably formed by a plate, or a chunk with a certain thickness made of a light material. The vertical frame 41 has a U shape cut 411, and the opening of the U shape cut 411 is used for installing an object installation. A lock device 42 is arranged to the opening of the U shape cut 411. A bottom side of the vertical frame 41 opposite to the opening of the U shape cut 411 is vertically extended with a linking seat 412. The linking seat 412 has a through hole 413 which is passed through by a linking component 414 so as to fix to a base A2 of a car handler.

Figure 8:
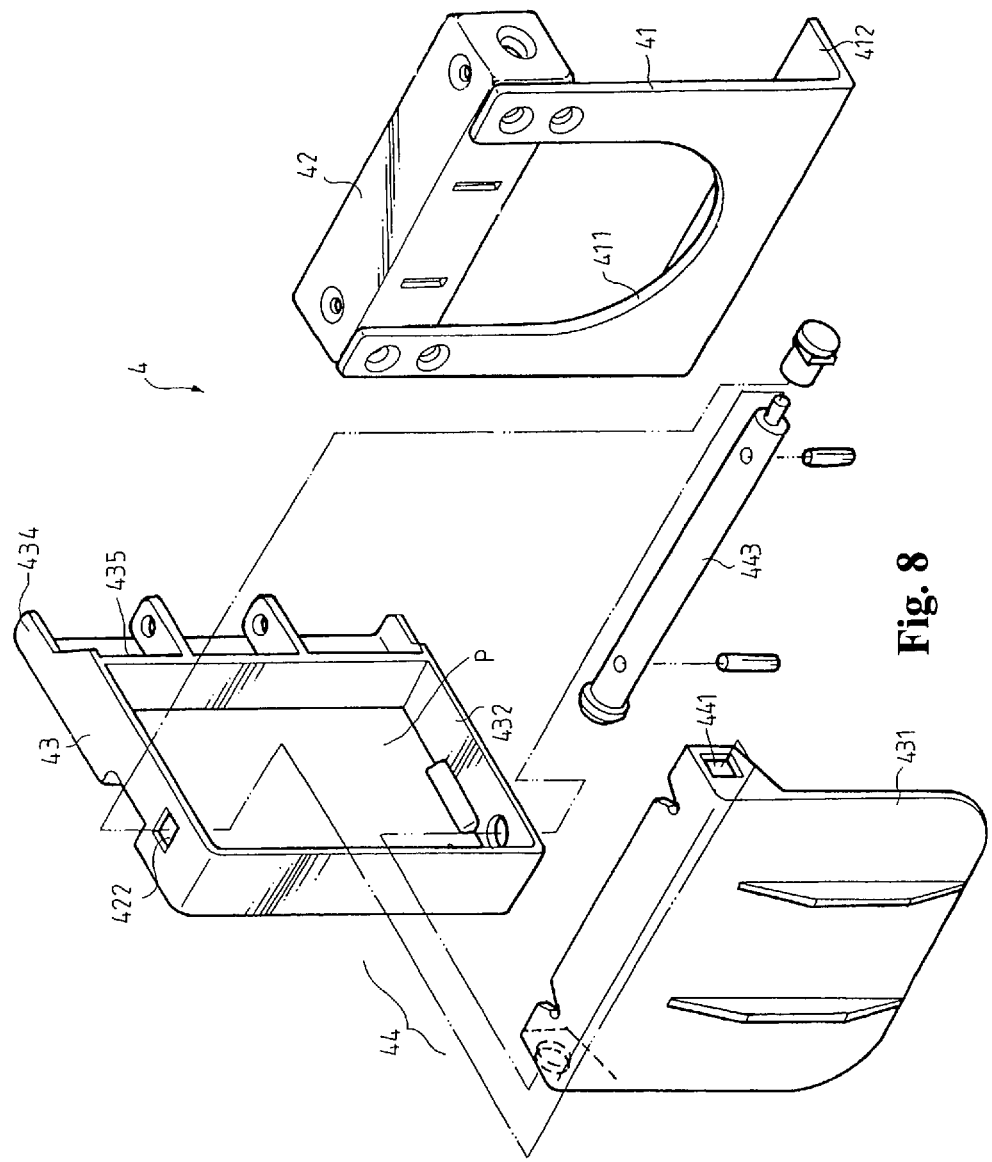
FIG. 8 is a rough exploded drawing of the car handler lock according to the present invention.

With reference to FIG. 8 and FIG. 7, a pivot unit 44 includes a buckle body 43 and a shield unit 431. The shield unit 431 has a plate structure and the buckle body 43 includes a bottom plate 435 and a bridge buckle 432. Furthermore, the bottom plate 435 and lateral plates 434 of the bridge buckle 432 define an opening P.

The bridge buckle 432 links the shield unit 431 and the vertical frame 41 as a bridge.

The bridge buckle 432 is an U shape structure and is preferably made of a plate. The bridge buckle 432 is pivoted to the shield unit 431.

Referring to FIG. 7, in assembly, a shaft 443 passes through through holes 441 of the shield unit 431 and through holes 442 of the bridge buckle 432 with the bridge buckle 432 covering the shield unit 431. The shield unit 431 is restrictedly pivoted to the bridge buckle 432 so that the angle between the shield unit 431 and the bridge buckle 432 is less than 90 degrees so as to prevent the shield unit 431 being over turned to be unlocked.

Referring to FIG. 7, an exploded view of the lock device 42 is illustrated. The lock device 42 includes two slots, and the bottom plate 435 has two insertion plates. In assembly, the two insertion plates insert into the two slots of the lock device 42 so as fix the lock device 42 to the bottom plate 435.

Figure 9:
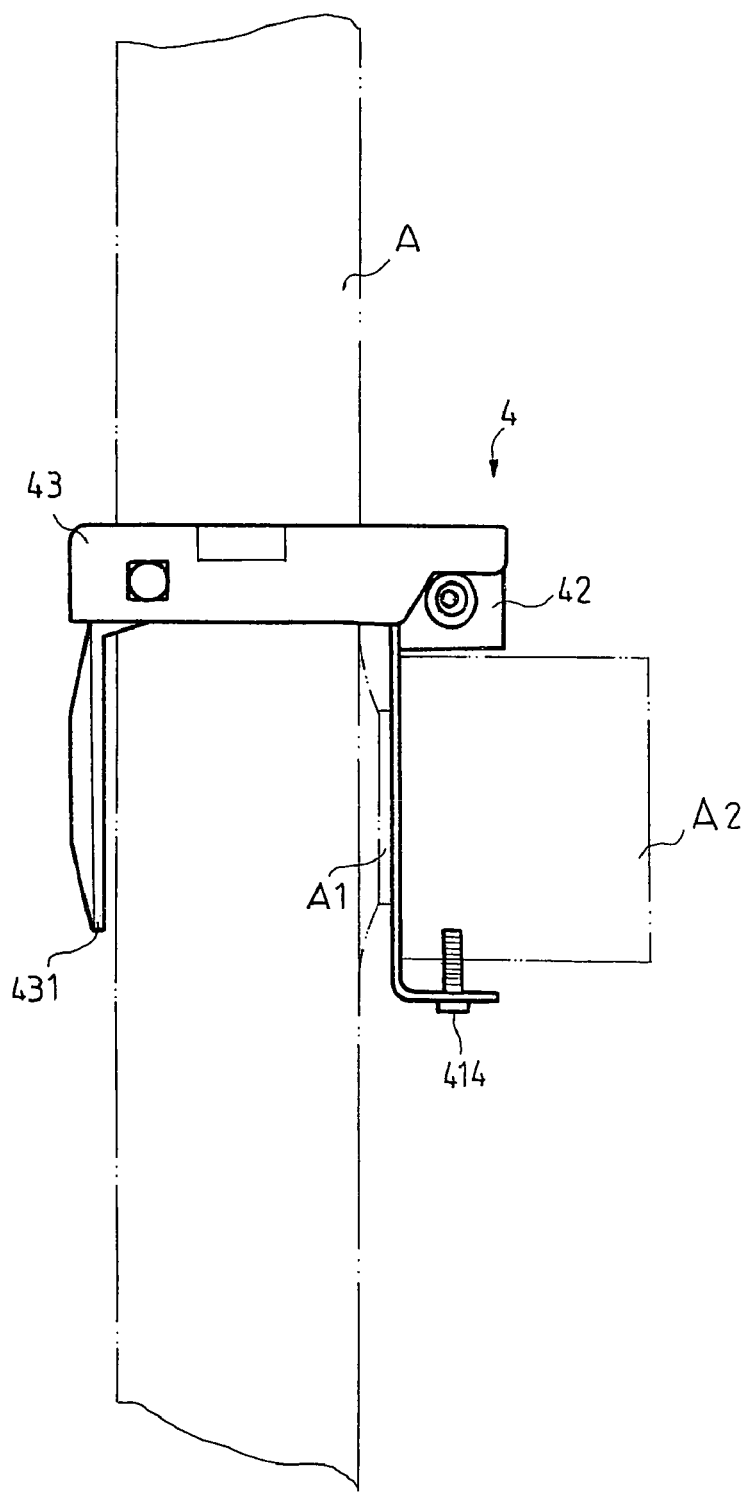
FIG. 9 is a lateral view showing an operation of the car handler lock according to the present invention.
Figure 10:
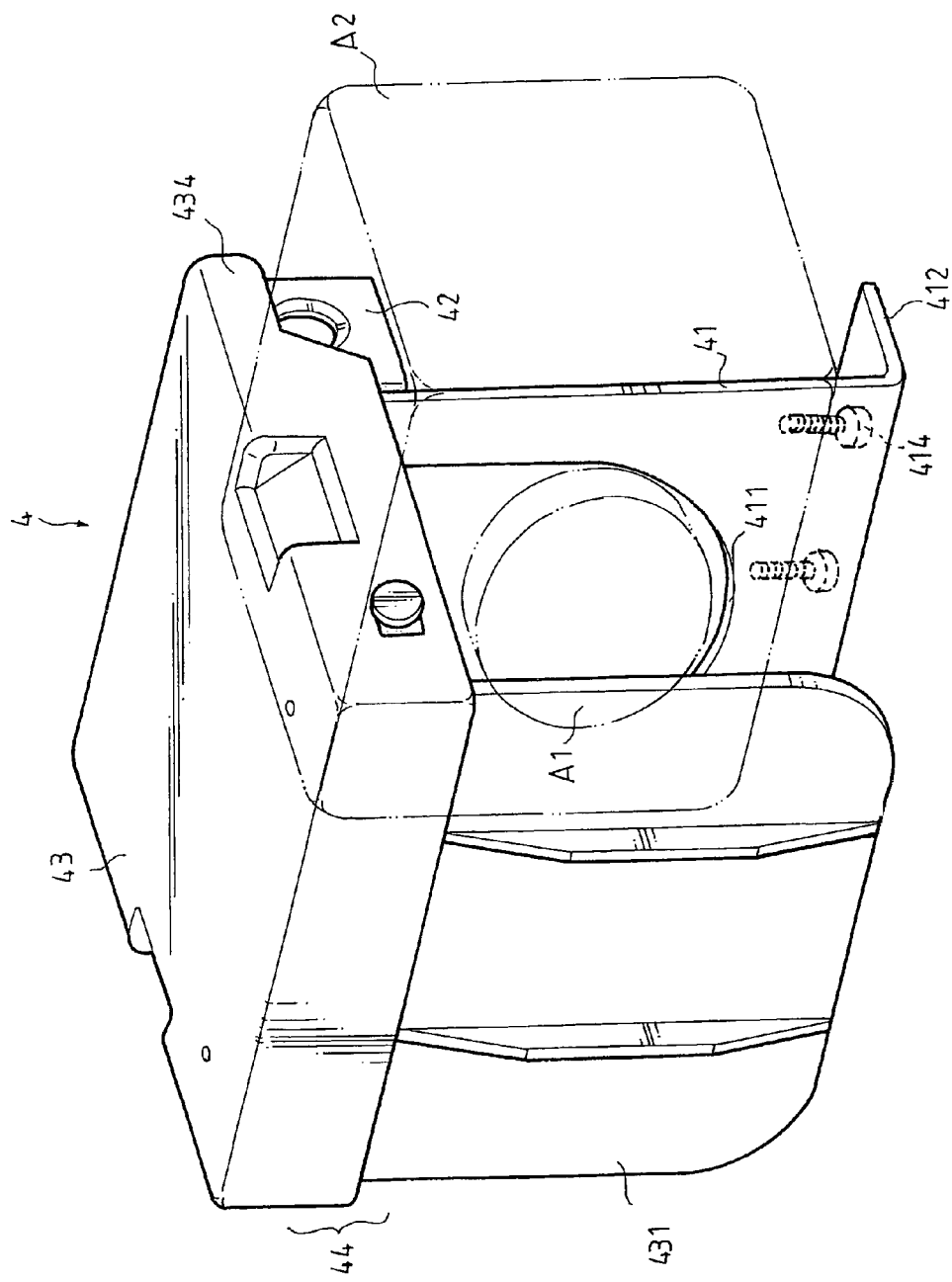
FIG. 10 is a prospective view showing the operation of the car handler lock according to the present invention.

With reference to FIGS. 9 and 10, the present invention provide a close space between the vertical frame 41 and the shield unit 431 by the lock device 42 locks the bridge buckle 432. Through the U shape cut 411, the vertical frame 41 can slide in and fixed to a shaft A1 of the car handler A. The lock device 42 locks the bridge buckle 432 of the buckle body 43 so that the shield unit 431 will provide an all-round protection to the car handler A.

Figure 11:
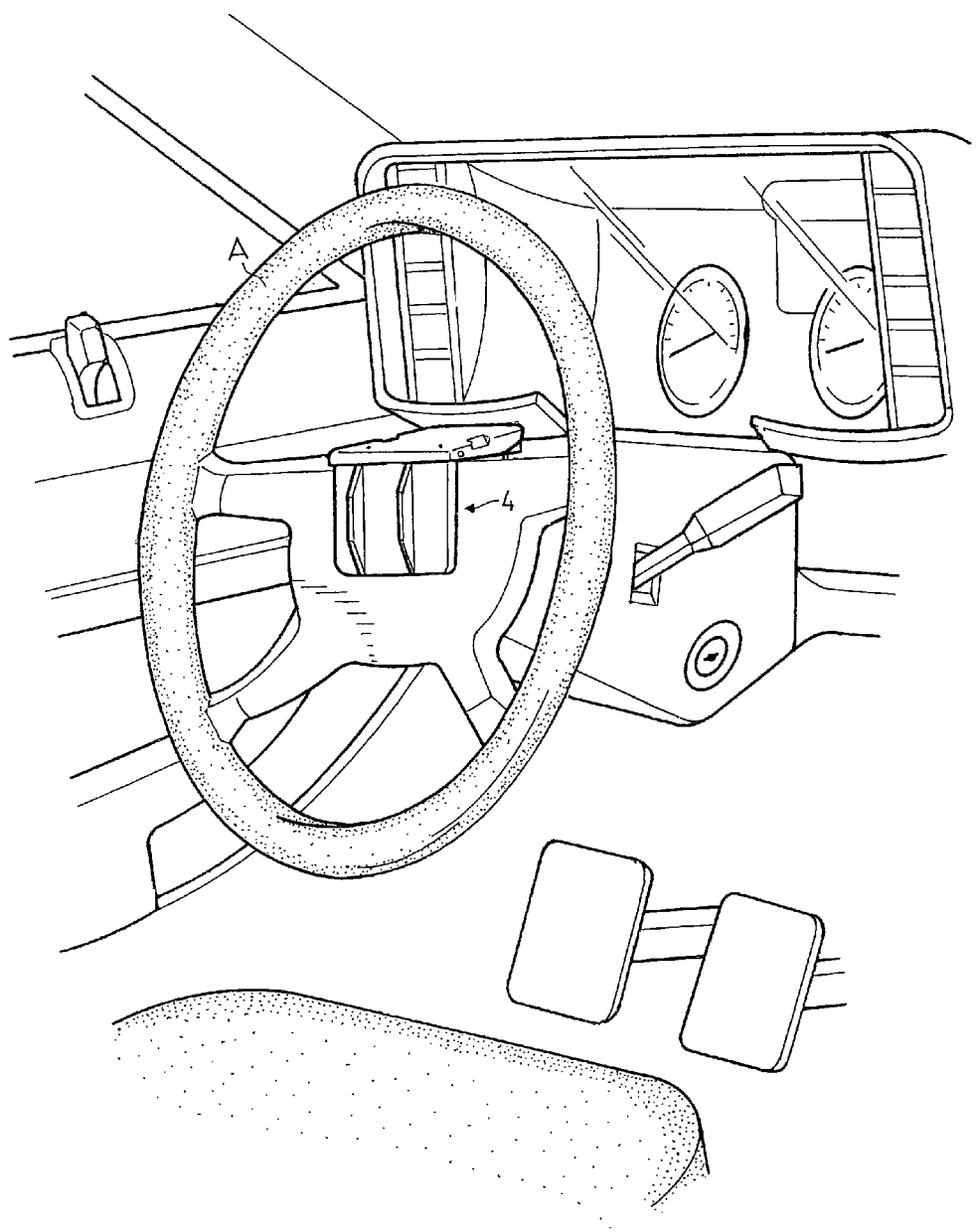
FIG. 11 is a schematic view 1 showing the application of the present invention.

Referring to FIG. 11, a schematic view showing a locking status of the present invention is illustrated. The car handler A is locked by the shield unit 431 in all directions.

Figure 12:
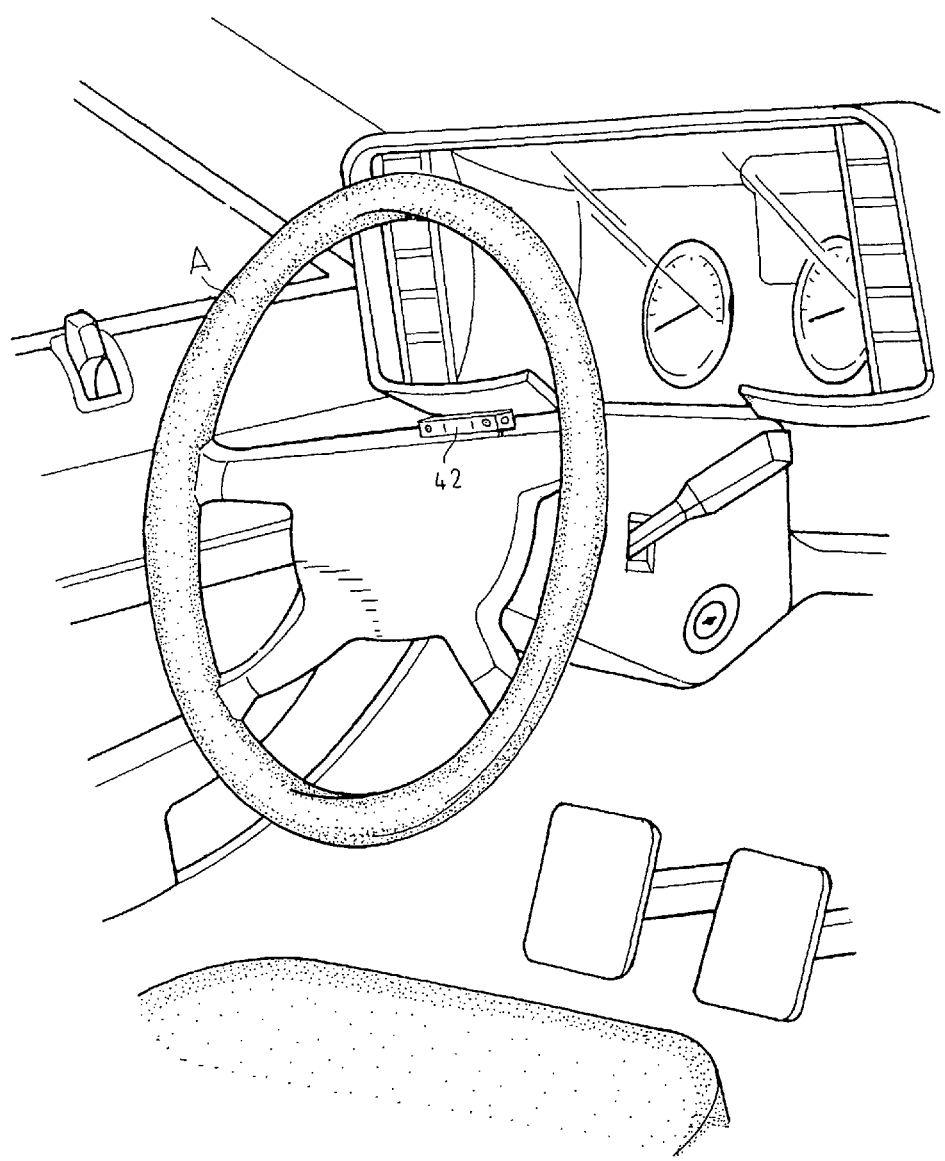
FIG. 12 is a schematic view 2 showing the application of the present invention.

Referring to FIG. 12, a schematic view showing an unlocking status of the present invention is illustrated. The lock device 42 is prospectively shown on a top of the vertical frame 41.

Figure 13:
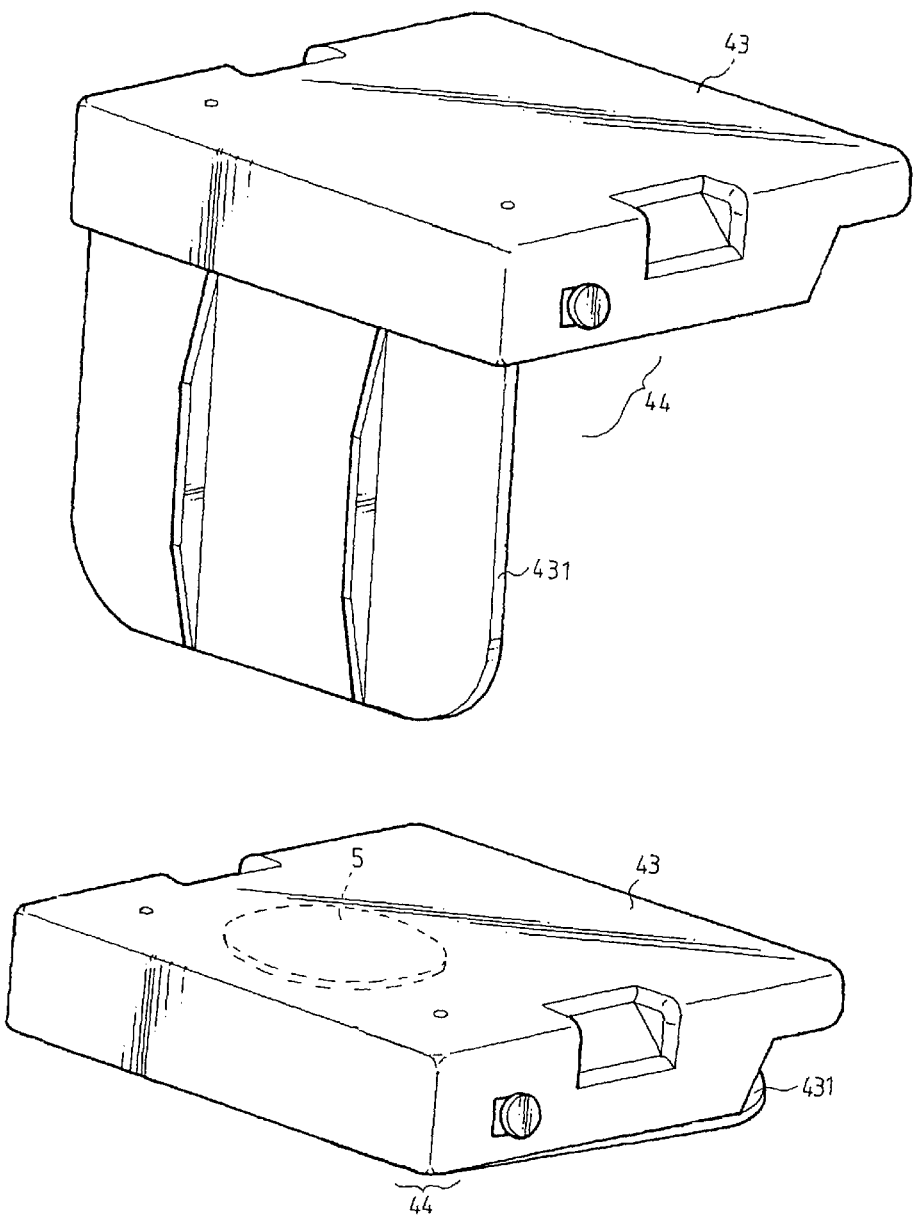
FIG. 13 is a schematic view 3 showing the application of the present invention.

Referring to FIG. 13, a shut status of the buckle body 43 according to the present invention is shown. The container P of the shut buckle body 43 can be used for receiving stuffs such as an alarm 5.

Figure 14:
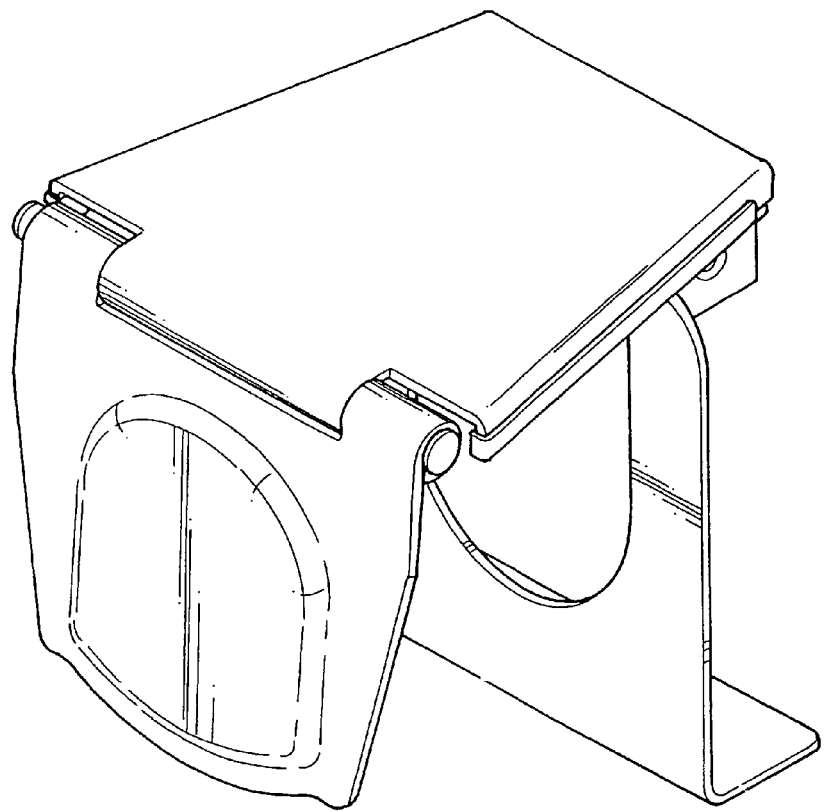
FIG. 14 is a schematic view showing the application of another embodiment of the present invention.
Figure 15:
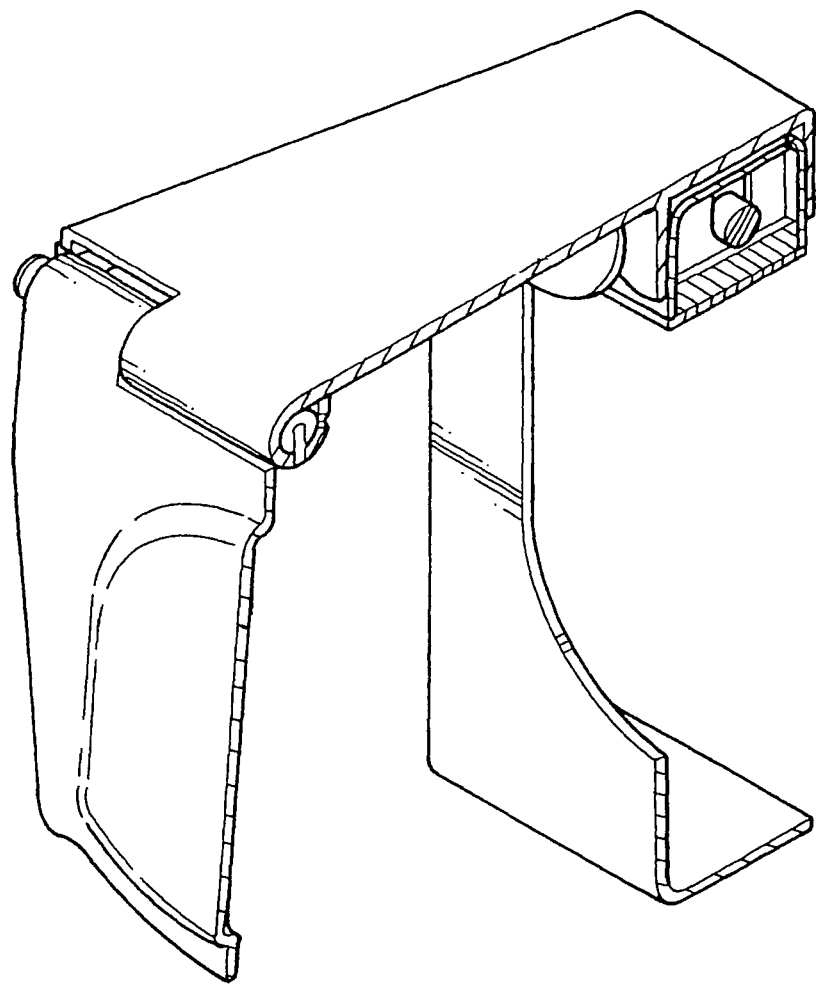
FIG. 15 is a cross-section view of the embodiment illustrated in FIG. 14.
Figure 16:
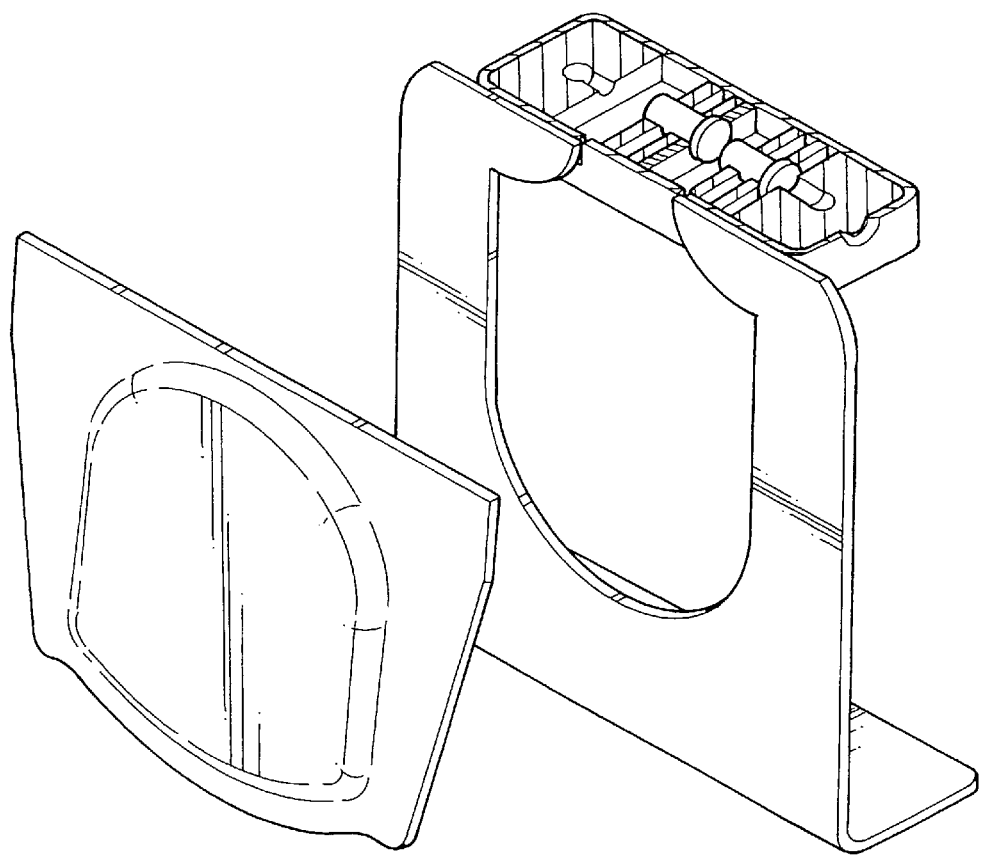
FIG. 16 is a schematic view 6 showing the application of the embodiment illustrated in FIG. 14.

Referring to FIG. 14, a schematic view showing another embodiment of the car handler lock with a better appearance is illustrated. Prospective views of the embodiment of the present invention are shown in FIGS. 15 and 16.

Excluding a better burglarproof function, the present invention has many advantages described in the following.

1. An easy and convenient assembly of the present invention will need no complicated technique to apply.

2. A small and light assembly of the present invention avoids scratching the interior or windscreen.

3. Time and space are substantially saved when using the present invention, it is also convenient to put the shut buckle body into car door or other glove compartment in car.

4. The present invention does not need large mold and a lot of lock components, the manufacture cost and factory space are much more saved than the prior stick locks.

5. The present invention is no longer cumbersome as prior art and will cause no trouble to female users.

6. The present invention is widely applicable to different sizes of car handlers.

7. An available space is applied inside the shut buckle body which is capable of storing stuffs like an alarm.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A car handler lock comprising:
a vertical frame (41) having a U shape cut for installing an object;
a lock device (42) arranged to an upper opening of the U shape cut (411); a bottom side of the vertical frame opposite to the opening of the U shape cut being vertically extended with a linking seat (412); the linking seat having a through hole (413) which is passed through by a linking component (414) so as to fix to a base of a car handler;
a pivot unit (44) including a buckle body (43) and a shield unit (431); the buckle body including a bottom plate (435) and a bridge buckle (432); the bottom plate (435) and lateral plates (434) of the bridge buckle (432) define an opening (P); the bridge buckle (432) linking the shield unit (431) and the vertical frame (41) as a bridge;
wherein in assembly, a shaft (443) passes through through holes (441) of the shield unit (431) and through holes (442) of the bridge buckle (432) with the bridge buckle covering the shield unit; the shield unit is restrictedly pivoted to the bridge buckle so that the angle between the shield unit and the bridge buckle is less than 90 degrees.

2. The car handler lock as claimed in claim 1, wherein the bridge buckle (432) is made of a plate.

3. The car handler lock as claimed in claim 1, wherein the lock device (42) includes two slots, and the bottom plate (435) has two insertion plates; and in assembly, the two insertion plates inserts into the two slots of the lock device so as fix the lock device to the bottom plate.

* * * * *